March 13, 1956 G. T. SCHJELDAHL 2,737,999
HEAT SEALING MACHINE
Filed April 10, 1953 2 Sheets-Sheet 1
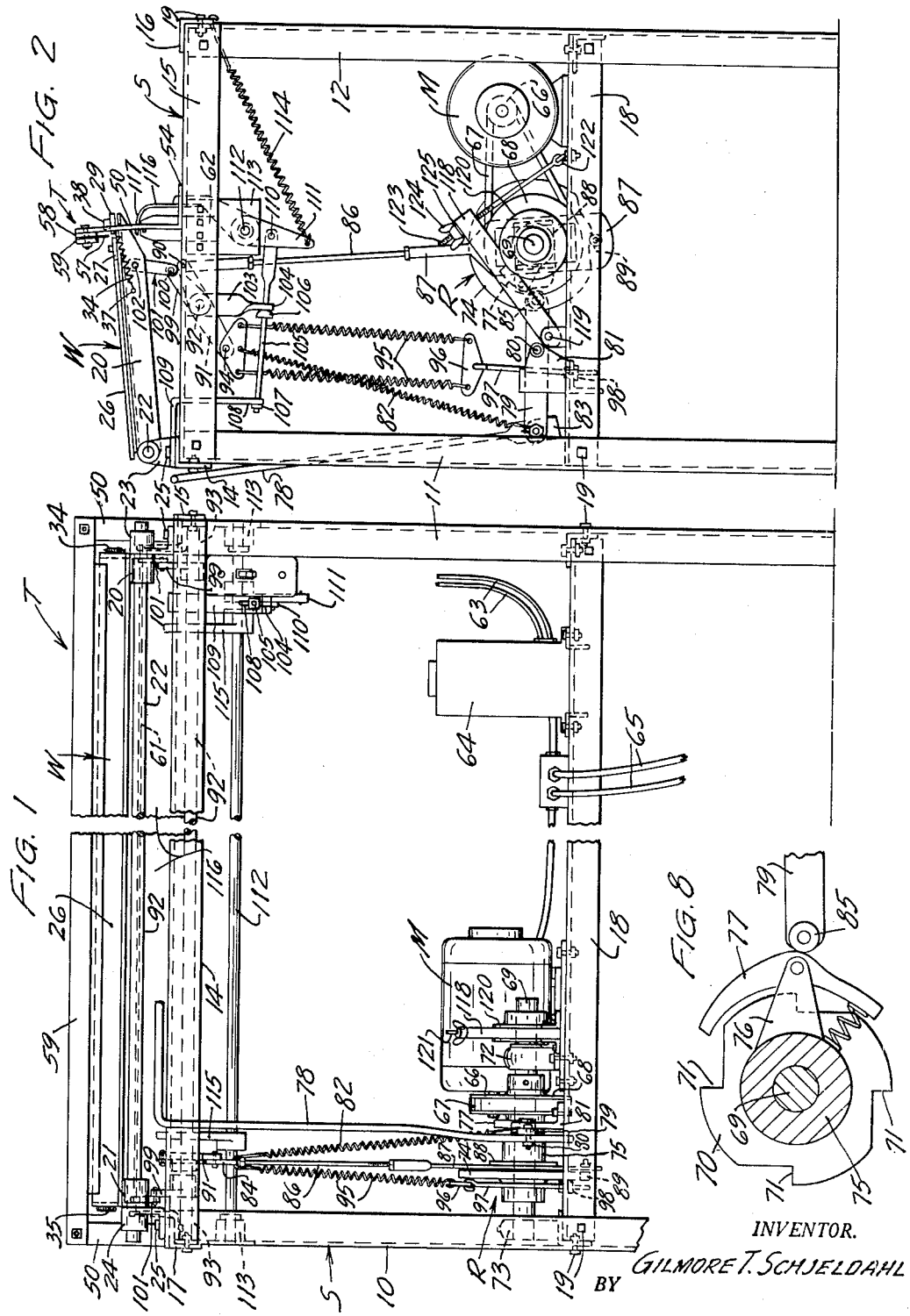
INVENTOR.
GILMORE T. SCHJELDAHL
BY
Williamson, Williamson, Schroeder & Adam
ATTORNEYS

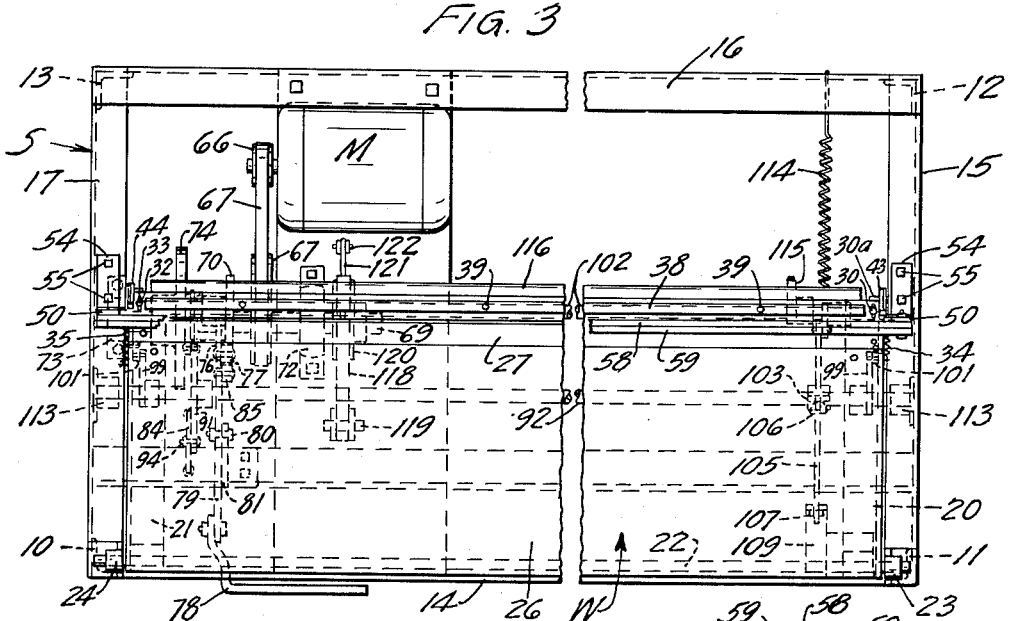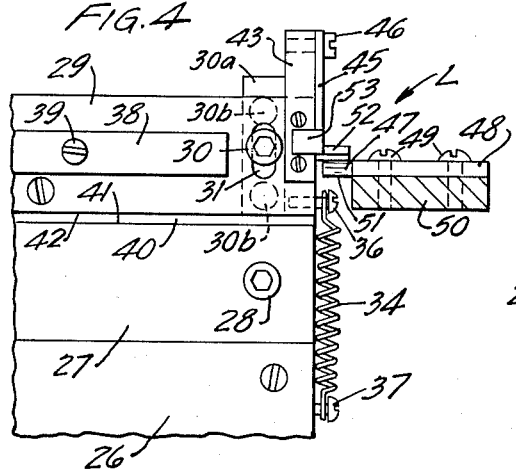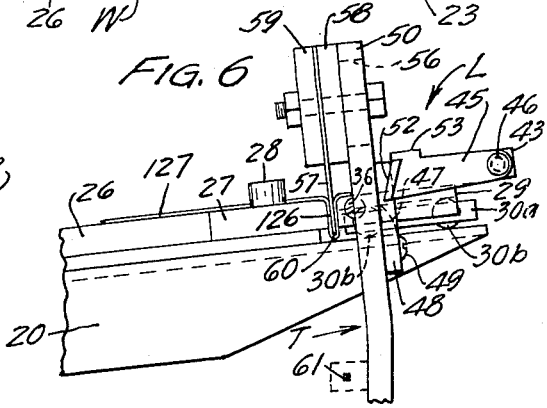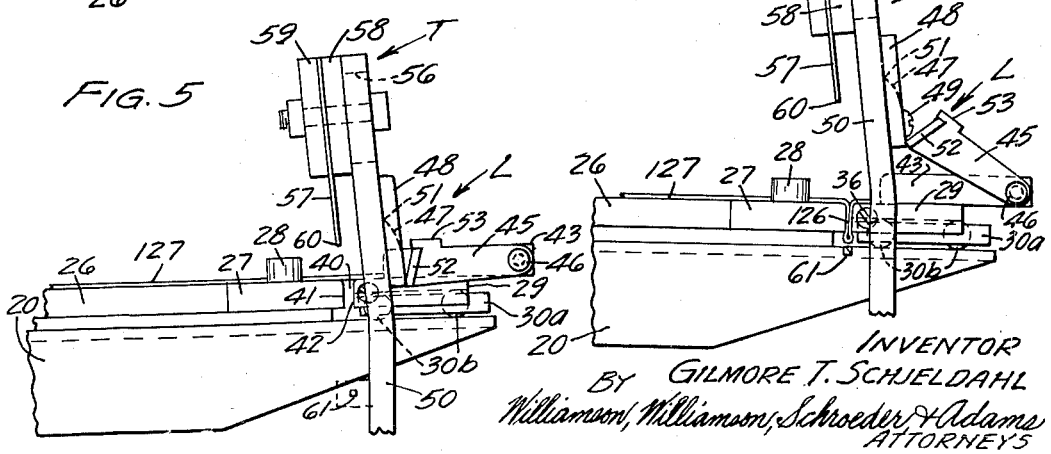

United States Patent Office 2,737,999
Patented Mar. 13, 1956

2,737,999
HEAT SEALING MACHINE

Gilmore T. Schjeldahl, Farmington, Minn., assignor to Herb-Shelly-Inc., Farmington, Minn., a corporation of Minnesota Application April 10, 1953, Serial No. 347,951

5 Claims. (Cl. 154—42)

This invention relates to heat sealing layers of thermoplastic sheet material and more particularly to a machine and method for forming seals of continuous length between a plurality of thermoplastic sheets.

In the art of heat sealing, there are a number of conventional machines employing several general procedures. One of these procedures involves pressing a heating element against one or both sides of layered thermoplastic sheets and heating at the point of pressure until the sheets fuse. This method is commonly used to make short seals such as for closures on plastic merchandise bags. Because the seal line is relatively short and the bag is an expendible item, provided with a temporary closure, the quality of the seal is not important.

Another type of seal, which is commonly employed in thermoplastic sheets, is formed by feeding the sheets through opposed traveling belts with the heating element in close and fixed relation with the belt. This type of sealing device, and others as well, require a complex cooling system, the purpose of which is to actually chill the parts of the machine adjacent and in contact with the area to be heat sealed. The simultaneous application of heat and cooling to contiguous areas presents an anomaly and introduces variable factors which make the sealing operation under such conditions highly critical. Here again, only relatively short seals are attempted.

To the best of my knowledge, there has not been developed a successfully operating machine which is capable of making dependable and uniform heat seals across sheets of various thermoplastic material along a length exceeding more than a few inches. The problem of making uniformly strong seals of good appearance becomes more acute the thinner the stock of thermoplastic material. Thus, machines which may produce good seals on material above one mil in thickness often completely fail in sealing the same material of a thickness below one mil, for example, a thickness of one-quarter mil.

A further problem is introduced if the plastic sheet material is oriented and/or tensilized during manufacture to increase the strength of the film. Orientation of the fiber or molecular structure causes the plastic sheet to become stronger in one direction than in another. An analogy may be drawn between woven cloth such as sheet material, and the oriented plastic film, although no visible fiber or lines can be seen in the flat plastic sheet. Now, if it is attempted to tear the woven sheeting, it will rupture lengthwise with the threads, and never diagonally. There is a similar tendency for oriented plastic sheets to tear in a preferred direction. In fabricating articles from oriented plastic sheets, the material is placed in such a direction that the greatest stress will coincide with the direction of greatest strength. In the case of tensilized films the "working" of the material during formation of the film will strengthen it materially without reference to the direction of fiber. Several examples of such plastic material which can be oriented or tensilized are various types of thermoplastic films such as "Mylar," (a condensation product of ethylene glycol and terephthalic acid), Pliofilm (rubber hydrochloride), polyethylene and polyvinylchloride. When the temperature of oriented and tensilized films is raised to a degree near the softening point, the film will become deoriented and weakened. Not only does the oriented film become weak where it is so heated, but it has a variable rate of shrinking and expansion. The oriented fiber will shrink more rapidly in one direction than another and ordinary heat seals of such plastic materials become puckered, wrinkled and even scalloped. Although the heat seal itself may be strong, the sheet plastic material immediately adjacent the seal will have become weakened to a point representing a small part of the ultimate strength of the material. The weakening phenomenon occurs both in the case of deoriented and detensilized films.

It is a general object of this invention to provide for a machine and method of heat sealing sheets of thermoplastic material along a precise elongated seam so as to efficiently heat and fuse only the very seal line itself.

It is another object of the invention to provide for a machine which will be simple and fool proof in operation, yet which will, because of the rigid alignment and positive holding and gripping of layered sheets of thermoplastic material, present an evenly tucked fold thereof to a uniform and controlled heating element.

It is a further object of the invention to provide for a method of heat sealing thermoplastic sheets, and especially thin oriented sheet stock, by positively preforming a long uniform fold of the sheets and pre-aligning the fold with a thin and narrow heating element followed by advancing relatively the heating element and fold so as to fuse only the very edge of the fold without weakening or softening the adjacent areas.

It is a further object of the invention to provide for a method of heat sealing thermoplastic sheets in which the sheets are moved in one direction to effect an offset fold, then moved in another direction to approach a continuously energized heating element, a heat shield being interposed between other parts of the machine and the sheet plastic material at all times other than during the actual heat sealing or fusing operation.

It is still a further object of the invention to provide for a heat sealing device which will automatically create a measured fold in layered sheets of thermoplastic material by means of a tucking blade, the fold being resiliently held after the formation thereof and automatically released upon completion of the cycle of operations.

These and other objects and advantages of my invention will more fully appear from the following description made in connection with the accompanying drawings wherein like reference characters refer to similar parts throughout the several views and in which:

Fig. 1 is a front elevation of my heat sealing machine, certain unessential portions being cut away to better illustrate the parts;

Fig. 2 is a side elevation of my machine looking at the device from the right in Fig. 1;

Fig. 3 is a plan view of the machine, the medial portion thereof being broken away;

Fig. 4 is an enlarged detail view of the resilient jaw and the trip latch mechanism, the detail being shown at the right hand portion of the work supporting and fold gripping element as viewed in Fig. 3;

Fig. 5 is a somewhat diagrammatic representation of the sheet tucking and fusing assembly as well as the work supporting and loop gripping element in neutral or starting position, unessential details having been eliminated;

Fig. 6 is a diagrammatic view similar to Fig. 5 showing the work supporting loop gripping element in upper position with a portion of a plastic sheet being tucked through the work supporting slot;

Fig. 7 is another diagrammatic view similar to Figs. 5 and 6 showing the work supporting and loop gripping element with sheet plastic in tucked relation therein, the element having been advanced toward the elongated heating means; and Fig. 8 is an enlarged view of the driving ratchet and driven dog members, portions being in vertical section and unessential parts omitted or cut away.

Referring now more particularly to the drawings, my heat sealing machine is supported on a structure S which may comprise four upright legs 10, 11, 12 and 13 as shown in Figs. 1, 2 and 3. A top frame interconnects the legs as shown and consists of angle members 14, 15, 16 and 17 as shown in Fig. 3. A base 18 is likewise interposed across the legs intermediate their ends for supporting the motor M and other mechanism which will be presently described. The legs and other portions of the supporting structure may be secured together as by welding or by other means such as screws or bolts 19.

The upper part of the supporting structure bears a work supporting and loop gripping element W which is in turn supported upon end braces 20 and 21 as shown in Figs. 1 and 2. The braces 20 and 21 terminate forwardly in gripping engagement with rod or shaft 22 which extends laterally of the braces 20 and 21. The ends of rod or shaft 22 are journaled in the bracket bearings 23 and 24 which are secured respectively to the forward ends of frame angle irons 15 and 17. The bracket bearings 23 and 24 may be secured to the structure S by such means as bolts 25. The work supporting and loop gripping element W further has a work supporting surface 26 which may comprise a flat board or table which extends from bracket or brace 20 across to the bracket or brace 21. Toward the rear of the work supporting surface 26 is a longitudinal edge 27 which constitutes a fixed jaw and is preferably formed of a metallic bar such as steel. This fixed jaw or longitudinal edge member may be secured to the braces 20 by such means as screws 28 at the outer ends of the fixed jaw member. The longitudinal edge or fixed jaw member comprises a continuation of the work supporting surface 26. A resilient movable jaw 29 is likewise mounted at the rearward ends of the brackets or braces 20 and 21, the mounting being effected by cooperation of a screw 30 with a guide slot 31 formed at the right end of the jaw 29 as shown in Fig. 4 and by a similar screw 32 and slot 33 formed at the other end of the jaw 29. In order to facilitate the smooth operation of the movable jaw 29 in advancing from and retracting towards the fixed jaw or edge 27, I may employ a block 30a containing recessed ball bearings 30b which underlie and form a rolling support for the ends of fixed jaw 29. The screws 30 and 32 are secured in threaded engagement with the rearward ends of braces 20 and 21 as shown. Resilient means such as tension springs 34 and 35 are interposed between abutments such as the screws 36 on the ends of movable jaw 29 and screws 37 secured to the side of the work supporting surface 26. The resilient jaw 29 may be provided with a stop bar 38 which is attached to the upper surface of the movable jaw 29 as by screws 39. It will be observed that the fixed and movable jaw members provide a slot 40 in the work supporting surface 26, the slot 40 having a side 41 on the longitudinal edge member 27 and a side 42 in opposed relation with the movable and resilient jaw 29. The tension springs 34 and 35 constantly urge the side surface 42 toward the side surface 41.

A trip latch mechanism L provides for opening and closing the slot 40 in the work supporting surface. More specifically, the trip latch L comprises a fixed bar 43 at the end of movable jaw 29 as shown in Fig. 4 and a similar bar 44 fixed to the other end of the movable jaw 29, each of the bars extending rearwardly from the outer edge of the movable jaw 29. The trip latch mechanism L is identical at each end of the movable jaw 29 and details of only that mechanism which is associated with the right end as viewed in Fig. 4 will be described. A dog or latch 45 is pivotally secured at 46 to the outer end of bar 43. A cam surface 47 is formed on a plate 48 which is attached by means such as screws 49 to a connecting piece 50, the entire cam surface and plate being rigid with respect to the supporting structure S. The cam surface 47 is tapered upwardly and forwardly to terminate in a top edge 51 as shown in Fig. 4. A laterally bent portion 52 on the latch 45 is adapted to cooperate with the cam surface 47. An ear 53 is likewise formed laterally of the latch or dog 45 and engages the bar 43 as the dog or latch moves downwardly so as to limit its lowermost position.

A sheet tucking and fusing assembly T is likewise mounted upon the supporting structure S across the uppermost frame members 15 and 17 thereof. The assembly T preferably lies parallel to the shaft or rod 22 upon which the work supporting and loop gripping element pivots and is positioned so that the medial open area of the assembly comprehends the outer or fold gripping portion of the work supporting and fold gripping element.

More specifically, the sheet tucking and fusing assembly T has formed at either side of the supporting structure S a connecting or spacing piece 50 at the one side as shown in Figs. 5, 6 and 7 and at the other side as shown in Fig. 3. The connecting piece 50 has a base portion 54 which in turn is secured by such means as bolts 55 each to a respective frame member 15 and 17. As previously pointed out, the connecting piece 50 has the plate 48 secured thereto by screws 49. The upper end of the connecting piece terminates in a slotted opening 56 at each side of the machine. Extending across the sheet tucking and fusing assembly is a sheet tucking blade 57 which is rigidly held between two bars 58 and 59, so that the lower edge 60 of the blade is aligned with the slot 40 in the work supporting surface and lies in spaced parallel relation with said surface. Since the slot 40 has an arcuate locus in the movement of the work supporting table about the pivot 22, the tucking blade 57 has its lower edge 60 in the projected arcuate path or locus of the slot. The connecting pieces 50 are given a slight bend so as to preposition the tucking blade 57 in the proper fixed relation to the upwardly swinging work supporting surface. The tucking blade 57 is thus rigidly secured across the entire supporting structure S and the horizontal edge 60 is in spaced parallel relation with the slot 40.

Also, in fixed relation with the supporting frame S and in spaced parallel relation with the edge 60 of the tucking blade 57 is a heating element 61 which is interposed between insulated mounting blocks 62 at each end of the top frame of the supporting structure S. The heating element 61 may be an elongated ribbon or wire having high electrical resistance so that it can be energized to effect a radiant heating upon the looped fold of plastic material which is held between the movable and fixed jaw of the work supporting and loop gripping element W. In the detailed drawings of Figs. 5, 6 and 7, the support and surrounding structure for the heating element 61 is not shown, it merely being indicated by the cross sectional configuration at the proper location with respect to the jaws and to the tucking blade. The arrangement of the fixed tucking blade 57 together with the connecting pieces 50 and the interposed fixed heating element 61 constitutes the sheet tucking and fusing assembly having an open area medially thereof. The rearward edge of the work supporting and loop gripping element W extends within this medial open area and can move upwardly and downwardly therein about the pivot shaft 22. The connecting leads 63 may be secured one at each end to the heating element or wire 61 and may be connected in series with a rheostat or other current controlling device 64 as shown in Fig. 1. The device, including the motor M, may be energized from a source of electric current through the conductors 65 as shown.

In order to effect the upward and downward movement of the work supporting and fold gripping element W, I have provided a mechanism R which is mounted upon the base 18 and is operably connected through cam and lever linkage to the work supporting and fold gripping element W as will be presently described.

The motor M has a drive pulley 66 which drives through a belt or other linkage 67 the driven pulley 68 which normally turns freely on shaft 69. Secured to and rotating with the pulley 68 is a ratchet member 70 (Fig. 8) having teeth 71 disposed about the peripheral circumference of the ratchet member 70. The shaft 69 is journaled in bearings 72 and 73 which are bolted or otherwise secured to the base 18. A cam wheel 74 is secured to the shaft 69 and has a hub 75 with a crank arm 76 also rigidly secured with respect to the shaft 69. The crank arm 76 has pivotally secured thereto a dog or latch 77 which is normally spring pressed inwardly to engage one of the teeth 71 to cause the shaft 69, cam 74 and other associated members to rotate therewith. An operating handle 78 is pivotally secured at a lower offset portion 79 through a pin 80 which in turn is mounted upon a bracket 81 fixed to the base 18 as shown in Fig. 2. A spring 82 is interposed between the handle 78 at its lower offset 79 and an upper plate or bracket 84 as shown in Fig. 2. The outer end of the offset 79 contains an abutment 85 which is adapted to contact the outwardly extending end of dog 77 so as to normally maintain the inwardly extending end of dog or latch 77 out of engagement with the teeth 71 of the ratchet wheel 70. When the abutment 85 is withdrawn, the dog 77 will come into engagement with the ratchet member and cause the parts to rotate together as previously noted.

A cam rod 86 is adjustably secured to a yolk 87 which surrounds the shaft 69 and is in sliding engagement with a rectangular block 88 which in turn is rotatably mounted upon the shaft 69 adjacent the cam 74 as shown in Figs. 1 and 2. The lower end of the yolk bears an abutment roller 89 which is in constant engagement with the cam surface of cam wheel 74. The upper end of the cam rod 86 is pivotally secured at 90 to a cross arm 91 which in turn is rigidly secured to the shaft 92. The shaft 92 is journaled in bearings 93, one each of which is secured to opposite sides of the supporting structure S. The opposite end of the cross arm 91 from the pivotal attachment 90 is in turn pivotally secured at 94 to the plate 84 as shown in Fig. 2. Tension springs 95 are interposed between plate 84 and plate 96, the plate 96 in turn being secured through the bolt 97 to the frame 18 by means of the threadably adjustably nut 98.

Also secured to the shaft 92 is a lever arm 99, the end of which is pivotally attached at 100 to a link 101 as shown in Fig. 2. The link 101 is pivotally attached at its upper end 102 to the bracket 21 and serves to actuate the work supporting and fold gripping element W in its upward and downward arcuate movement. The springs 95 will, through the foregoing linkage, normally maintain the work supporting and fold gripping element W in its uppermost position. In order to obtain a balanced operation, a duplicate lever arm 99 and pivoted linkage 101 is interposed between shaft 92 and the bracket 20 in the right hand side of the machine as viewed in Fig. 1.

Also secured to the shaft 92 is a lever 103 which terminates in a perforate end 104. A rod 105 extends loosely through the perforate end 104 and has rigidly mounted thereon an abutment 106 which is adapted to come into contact with the flat end 104. The forwardmost end of the rod 105 has an adjustable nut or abutment 107 which is adapted to engage the forked end 108 of an inverted L-shaped bracket 109, the bracket being secured to the upper framework of the supporting structure S. The rearwardmost end of the rod 105 terminates in a pivotal connection 110 on a lever arm 111 as shown in Fig. 2. The lever arm 111 in turn is pivoted at 112 which is journaled in the bearings 113 secured at either end of the supporting structure S. The lower end of the lever arm 111 has a tension spring 114 which is secured at its opposite end to the supporting structure S at the top frame member 16. The shaft 112 has fixed thereto a pair of brackets 115 as shown in Fig. 1, the outer ends of which are fastened to a shield 116 having a bent upper end 117 as shown in Fig. 2. The bent upper end is adapted to overlie the heating element 61 throughout its entire length.

In order to prevent jumping and irregular movement of the shaft 69 during the operation of the machine, a brake shoe 118 is mounted pivotally at 119 to the base 18 and in constant frictional relationship with the peripheral circumference of a wheel 120. A rod 121 is pivotally attached at 122 to the base 18 and extends through the outer end of the brake 118 to terminate in a threaded end 123. A wing nut 124 bears against a compression spring 125 which in turn imparts braking to the brake member 118 and the wheel 120.

*Operation*

In the operation of my device, the heating element is energized through leads 63 with the work supporting and fold gripping element W in the neutral position shown in Fig. 5. The shield 116 overlies the heating element at this point so as to prevent transfer of radiant heat to the jaw members or to plastic sheets held therein. The plurality of overlapping thermoplastic sheets may then be placed upon the work supporting surface 26 with their outer edges coinciding if it is desired to make a marginal seal. The edges are then brought into contact with the bar 38 with the sheets disposed over the slot 40 for a considerable continuous length. The slot 40 will be open as shown in Fig. 4. The lever 78 is then pulled in a forward direction away from the supporting structure S as viewed in Fig. 2. The lower end of the handle mechanism will pivot about the pin 80 and will retract the abutment roller 85 from the lower end of dog 77. Since the dog 77 is spring pressed toward the ratchet teeth 71, this movement will interlock the cam member 74 with the rotating ratchet 70. The roller abutment 89 of the cam rod 86 is in the position shown in Fig. 2 at the beginning of the operation so as to place the work supporting and fold gripping element W in its intermediate position as shown in Fig. 5. With the cam element 74 shown in the position of Fig. 2, the shaft will rotate in a clockwise direction allowing the cam rod to move upwardly for a short interval. The lever arm 91 will then be caused to turn in a counterclockwise direction because of the tension of springs 95 and the work supporting and fold gripping element W moving upwardly, together with the thermoplastic sheets disposed thereon. The position thus assumed will be as shown in Fig. 6. The tucking blade 57 will force an offset fold or loop 126 of the thermoplastic sheets 127.

Since the latch mechanism L also moves upwardly and out of contact with cam surface 47, the movable jaw 29 will snap inwardly with face 42 abutting face 41. The fold 126 will then be pinched between the surfaces against the tension of springs 34. Now as the cam wheel 74 continues to turn, the cam roller 89 will again be caused to ride on the outer diameter of the cam wheel. This action will depress the entire work supporting and fold gripping element W to its lowermost position as shown in Fig. 7. The trip latch 45 will merely ride over the top of the cam surface 47 in the downward movement and finally fall back into contact with the bar 43 with the ear portion 53 resting thereon.

Also simultaneously with the downward movement is the movement of arm 103 which will strike the abutment 106 on rod 105 and cause the shaft 112 to turn in a clockwise direction so as to pull away the shield 116 from its position over the heating element 61. The shield is so arranged, of course, that the withdrawing movement just precedes the lowering of the work supporting and fold gripping element W and without coming in contact therewith. With the downward movement, the tucking blade 57 remains in its fixed position and the fold 126 likewise remains secured between the movable jaw 29 and the fixed jaw 27. The lowermost portion of the loop or fold 126 is brought into proximity of the heating element 61 along its entire length with the radiant energy therefrom being applied only to the line nearest it. There will be no radiation striking the sides of the fold so as to partially soften the material. As soon as the fold has melted at its lowermost line, the cam wheel 74 will have again come around to its starting position as shown in Fig. 2 and Fig. 5 with the work supporting and fold gripping element W in the neutral position thereshown. As the trip latch 45 moves upwardly, the sloping surface thereof will engage the cam surface 47 at the lower edge at each end of the movable jaw 29 and cause the surface 42 of the movable jaw 29 to move away from the surface 41 of the fixed jaw 27 to reopen the slot 40 and allow the thermoplastic sheets 127 to be removed therefrom. On the upward return movement to the intermediate position, the arm 103 will again move in a counterclockwise direction so as to allow the shield 116 to spring back under spring tension 114 and overlie the heating element 61. The element 61 thus can be continuously energized without the danger of unduly heating the jaw elements or thermoplastic material placed therein prior to the actual fusing operation. It is understood, of course, that the flexibility and adjustability of the various parts of my machine make it possible to accommodate thermoplastic sheets of various thicknesses and various qualities. For example, I may so adjust the position of the fixed tucking blade 57 that a larger loop or fold 126 will be formed in the material. This loop or fold can then be brought into closer proximity to the wire 61 for effecting a greater transfer of heat therethrough.

Since the loop or fold 126 is rigidly held throughout its entire length, there is no opportunity for the material to pucker or wrinkle. The outermost portion of the fold can thus be presented to a narrow heating element which will precisely fuse the fold despite the unusual length thereof.

It may thus be seen that I have devised a simple and efficient machine for heat sealing thermoplastic material along a continuous and considerable length thereof, the seal being strong and dependable even when the thermoplastic material is thin and of oriented structure.

It will, of course, be understood that various changes may be made in the form, details, arrangement and proportions of the parts without departing from the scope of my invention.

What I claim is:

1. In a heat sealing machine for uniting sheets of thermoplastic material in a continuous longitudinal seal, the combination of a work supporting and fold gripping element having a slot extending therethrough, the sides of said slot being movable together for gripping a sheet fold therein and separable for the release thereof, a sheet tucking and fixed fusing assembly disposed laterally to said work supporting surface and normally in aligned medial clearance with said slot, mechanism for relatively advancing said work supporting and fold gripping element with layered plastic sheets disposed thereover in one direction with respect to said assembly and into contact therewith to cause a fold of said sheets to be tucked through and somewhat beyond the sides of said slot and for relatively advancing the tucked fold in the opposite direction into close clearance with said assembly for applying heat and fusing said sheets only at the forwardmost edge of the fold thereof.

2. In a heat sealing machine for uniting sheets of thermoplastic material in a continuous longitudinal seal, the combination of a work supporting surface having a longitudinal edge, a jaw mounted along said longitudinal edge and normally resiliently urged toward the longitudinal edge to cooperate therewith in continuous, even pressure, a tucking blade having a thin edge normally positioned in spaced clearance with the surface and in alignment with said longitudinal edge, a narrow and elongated heating element secured in fixed and parallel spaced relation with the edge of said tucking blade, and mechanism operably connecting the tucking blade and heating element with the work supporting surface and jaw whereby said surface and jaw with layered plastic sheets positioned thereover may be moved first relatively toward said tucking blade and away from said heating element for introducing a fold of the layered plastic sheets between and past the jaw and longitudinal edge and then may be moved relatively away from the tucking blade and toward said heating element for fusing said sheets at the fold edge thereof.

3. In a heat sealing machine for uniting sheets of thermoplastic material in a continuous longitudinal seal, the combination of a sheet supporting surface having a longitudinal edge, a jaw mounted along said longitudinal edge and normally resiliently urged toward the longitudinal edge to cooperate therewith in continuous, even pressure, a sheet tucking and fusing assembly disposed laterally to said sheet supporting surface and normally in aligned medial clearance with the plane of contact between said jaw and said longitudinal edge, mechanism for relatively advancing said supporting surface and jaw together with layered plastic sheets disposed thereover in one direction with respect to said assembly and into contact therewith to cause a fold of said sheets to be tucked within the jaw and longitudinal edge, for relatively advancing the tucked fold in the opposite direction into close clearance with said assembly for fusing said sheets at the fold thereof and for returning said sheet supporting surface to its normally aligned medial clearance with said sheet tucking and fusing assembly, and cam mechanism connected with said resilient jaw and said assembly for moving the jaw out of gripping contact with said sheets upon return of said sheet supporting and fold gripping element to its normal medial clearance.

4. In a heat sealing machine for uniting sheets of thermoplastic material in a continuous longitudinal seal, the combination of a work supporting and fold gripping element having a slot extending therethrough, the sides of said slot being movable together for gripping a sheet fold and separable for the release thereof, a sheet tucking and fixed fusing assembly disposed laterally to said work supporting surface and normally in aligned medial clearance with said slot, mechanism for relatively advancing said work supporting and fold gripping element with layered plastic sheets disposed thereover in one direction with respect to said assembly and into tucking contact therewith to cause a fold of said sheets to be tucked and gripped between the sides and through said slot and for relatively advancing the tucked fold in the opposite direction in close clearance with said assembly for heating and fusing said sheets at the outermost edge of the fold thereof and for returning said work supporting and fold gripping element to said normal medial clearance, and a shield plate normally interposed in medial clearance with said slot and said assembly for preventing the radiation of heat to said work supporting and fold gripping element and retractable from the normally interposed position during the relatively advancing movement of said element during fusing of said sheets.

5. In a heat sealing machine for uniting sheets of thermoplastic material in a continuous longitudinal seal, the combination of a work supporting surface having a longitudinal edge, a jaw mounted along said longitudinal edge and normally resiliently urged toward the longitudinal edge to cooperate therewith in continuous, even pressure, a tucking blade having a thin edge normally positioned in spaced clearance with the surface and in alignment with said longitudinal edge, a narrow and elongated heating element disposed in fixed parallel spaced relation with the edge of said tucking blade and connected by a rigid structure passing around said work supporting surface so as to leave an unobstructed space therearound, said work supporting surface being mounted with respect to said rigid tucking blade and heating element for movement toward said blade whereby a pair of plastic sheets disposed on said work supporting surface and over said longitudinal edge will be tucked in clamping engagement with said jaw and extending to the other side thereof in a sharp even fold, and may be moved away from said blade and toward the narrow heating element to present the most outwardly extending portion only of the sharp fold to the narrow heating element for fusing in a narrow line the two plastic sheets at said outermost portion of the fold.

References Cited in the file of this patent

UNITED STATES PATENTS 2,524,584     Zehr  --------------------  Oct. 3, 1950